(12) United States Patent
Thelen

(10) Patent No.: US 7,689,577 B2
(45) Date of Patent: Mar. 30, 2010

(54) REARRANGING DATA SECTIONS WITHIN A PAGE FILE

(75) Inventor: Greg Thelen, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 317 days.

(21) Appl. No.: 11/787,612

(22) Filed: Apr. 16, 2007

(65) Prior Publication Data

US 2008/0256104 A1    Oct. 16, 2008

(51) Int. Cl.
*G06F 17/00* (2006.01)
(52) U.S. Cl. ..................................... 707/101
(58) Field of Classification Search ................ None
See application file for complete search history.

(56) References Cited

U.S. PATENT DOCUMENTS

| 5,930,830 A * | 7/1999 | Mendelson et al. ......... 711/171 |
| 6,421,827 B1 * | 7/2002 | Dimpsey et al. ............ 717/178 |
| 6,956,507 B2 * | 10/2005 | Castelli et al. ................ 341/50 |
| 7,010,656 B2 * | 3/2006 | Gupta ........................ 711/165 |

* cited by examiner

*Primary Examiner*—Uyen T. Le

(57) ABSTRACT

Data sections are rearranged within a page file associated with an operating system such that one or more non-contiguous data sections are made to be contiguous. The technology initially accesses a page file which comprises a plurality of data sections. The plurality of data sections within the page file are analyzed. Then, the plurality of data sections are rearranged such that at least one or more non-contiguous data sections are contiguous within the page file.

20 Claims, 7 Drawing Sheets

600

```
Access a page file which
comprises one or more
data sections
605
```

↓

```
Analyze one or more data
sections within a page file
610
```

↓

```
Rearrange data sections
such that at least one or
more non-contiguous data
sections are contiguous
within a page file
615
```

FIG. 6

REARRANGING DATA SECTIONS WITHIN A PAGE FILE

TECHNICAL FIELD

The present invention relates to virtual memory. More specifically, embodiments of the present invention relate to management of page files associated with virtual memory.

BACKGROUND

In the days of command prompts and 1.2 MB floppy disks, programs needed very little random access memory (RAM) to run because the main operating system's footprint was small. RAM at this time was very expensive and 4 MB of RAM was considered then to be a large amount of memory. However, as computers became more powerful, more than 4 MB of memory was found to be needed.

Eventually, a pseudo-RAM or 'virtual memory' was created, to make up for the finite amounts of RAM when running memory-intensive programs. When physical memory (RAM) is used up, excess data is sent to virtual memory storage. Later, if information stored in virtual memory storage is needed to run a program, this data is sent from virtual memory storage to RAM.

However, there exist many limitations to the current state of technology with respect to virtual memory. For example, the search and seek time for needed data stored in virtual memory remains high, thereby expending the user's time and money resources.

SUMMARY

A method for rearranging one or more data sections within a page file associated with an operating system is disclosed. The technology initially accesses a page file, which comprises one or more data sections. Data sections within a page file are analyzed. Data sections are then rearranged such that at least one or more non-contiguous data sections are contiguous within a page file.

DESCRIPTION OF THE DRAWINGS

The accompanying drawings, which are incorporated in and form a part of this specification, illustrate embodiments of the technology for providing a method for rearranging data sections within a page file associated with an operating system and, together with the description, serve to explain the principles discussed below:

FIG. 6 is a flowchart of an example method for rearranging data sections within a page file associated with an operating system in accordance with one embodiment of the present technology.

The drawings referred to in this description should be understood as not being drawn to scale except if specifically noted.

DETAILED DESCRIPTION

Reference will now be made in detail to embodiments of the present technology for rearranging data sections within a page file, examples of which are illustrated in the accompanying drawings. While the technology for rearranging data sections within a page file will be described in conjunction with various embodiments, it will be understood that they are not intended to limit the present technology for rearranging data sections within a page file to these embodiments. On the contrary, the present technology for rearranging data sections within a page file is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for rearranging data sections within a page file. However, the present technology for rearranging data sections within a page file may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "analyzing", "rearranging", "indicating", "utilizing", "identifying", "reordering", "providing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for rearranging data sections within a page file is also well suited to the use of other computer systems such as, for example, optical and mechanical computers.

Example Computer System Environment

Figure 1:
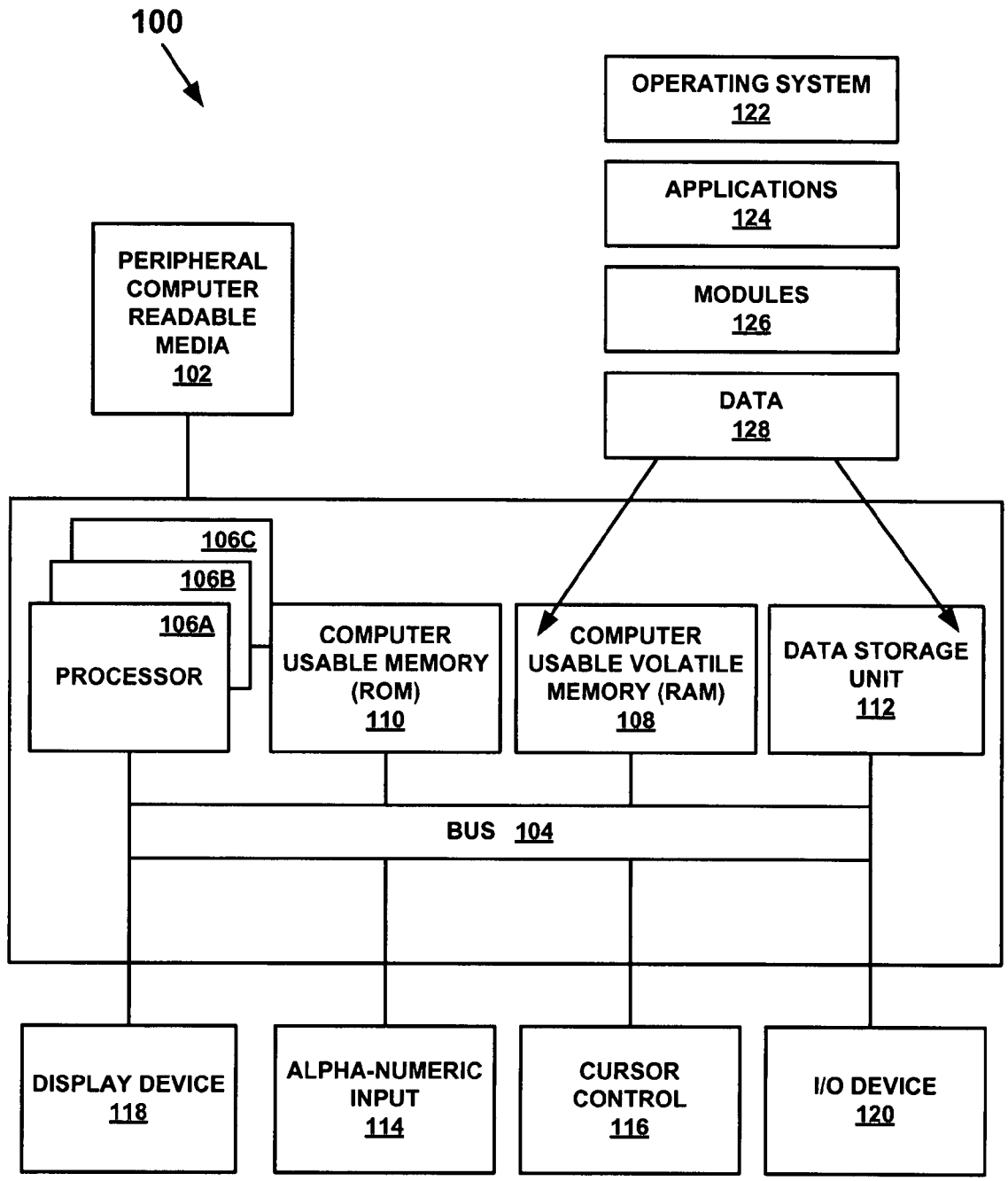
FIG. 1 is a diagram of an example computer system used in accordance with embodiments of the present technology.

With reference now to FIG. 1, portions of the technology for rearranging data sections within a page file are composed of computer-readable and computer-executable instructions that reside, for example, in computer-usable media of a computer system. That is, FIG. 1 illustrates one example of a type of computer that can be used to implement embodiments, which are discussed below, of the present technology for rearranging data sections within a page file.

FIG. 1 illustrates an example computer system 100 used in accordance with embodiments of the present technology for rearranging data sections within a page file. It is appreciated that system 100 of FIG. 1 is an example only and that the present technology for rearranging data sections within a page file can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. RAM 108 and data storage unit 112 may each include one or more page files.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alphanumeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for rearranging data sections within a page file is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive; and that further, operating system 122 may be accessed from a remote location via, for example, a coupling to the internet. In one embodiment, the present technology for rearranging data sections within a page file, for example, is stored as an application 124 or module 126 in memory locations within RAM 108 and memory areas within data storage unit 112. RAM 108 and data storage unit 112 may also include one or more page files. The present technology for rearranging data sections within a page file may be applied to one or more elements of described system 100. For example, a method for rearranging data sections within a page file may be applied to operating system 122, applications 124, modules 126, and/or data 128. A method for rearranging data sections within a page file may be stored in operating system 122, and applied via a kernel within operating system 122.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the example computing system 100.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

As an overview, virtual memory may include one or more page files. A page file is a chunk of storage space on the hard disk drive reserved for data which does not fit into RAM or has not been used in a while. For example, the data sections stored within a single page file may be devoted to an entire application process, or to subsections of an application process.

Once requested to perform a task, a computer may realize that the data sections needed to perform this task are in one or more page files as opposed to being readily available in RAM. In order to execute this task, data sections (or processes) will then be demanded from a page file and read into RAM. Ideally, these data sections would be gathered from a page file and read into RAM in a single input/output.

However, due to factors such as an author's edits and the paging out process, these needed data sections within page files become non-contiguously aligned. Consequently, several input/output functions are required in order to gather and read into RAM these needed data sections. In order to gather data sections, the head of the hard disk drive must physically move to the location of the data section. This movement takes time. Hence, the more scattered the needed data sections are, the more movement is required of the hard disk drive head to gather these data sections. This large amount of movement and repeated reading of data sections into RAM is time consuming, and results in a slowed computer performance.

Embodiments of the present invention provide a method for rearranging data sections within a page file. By rearranging these data sections to be more contiguous within a page file, data access and retrieval speeds increase, and input/outputs decrease. For example, if two data sections are arranged to be contiguous, then only one input/output is needed to search, gather, and read these two data sections into RAM. The present technology enables the increase in data access and retrieval speeds, thereby lowering the cost associated with reading data sections into RAM.

In one embodiment, a page file accessor will access a page file which comprises one or more data sections. The data sections within this page file will be analyzed by a data section analyzer. Then a data section rearranger rearranges data sections such that at least one or more of the non-contiguous data sections are contiguous within the page file. By rearranging data sections within a page file to be more contiguous, the present technology enables a low search per seek time ratio.

Architecture

Figure 2:
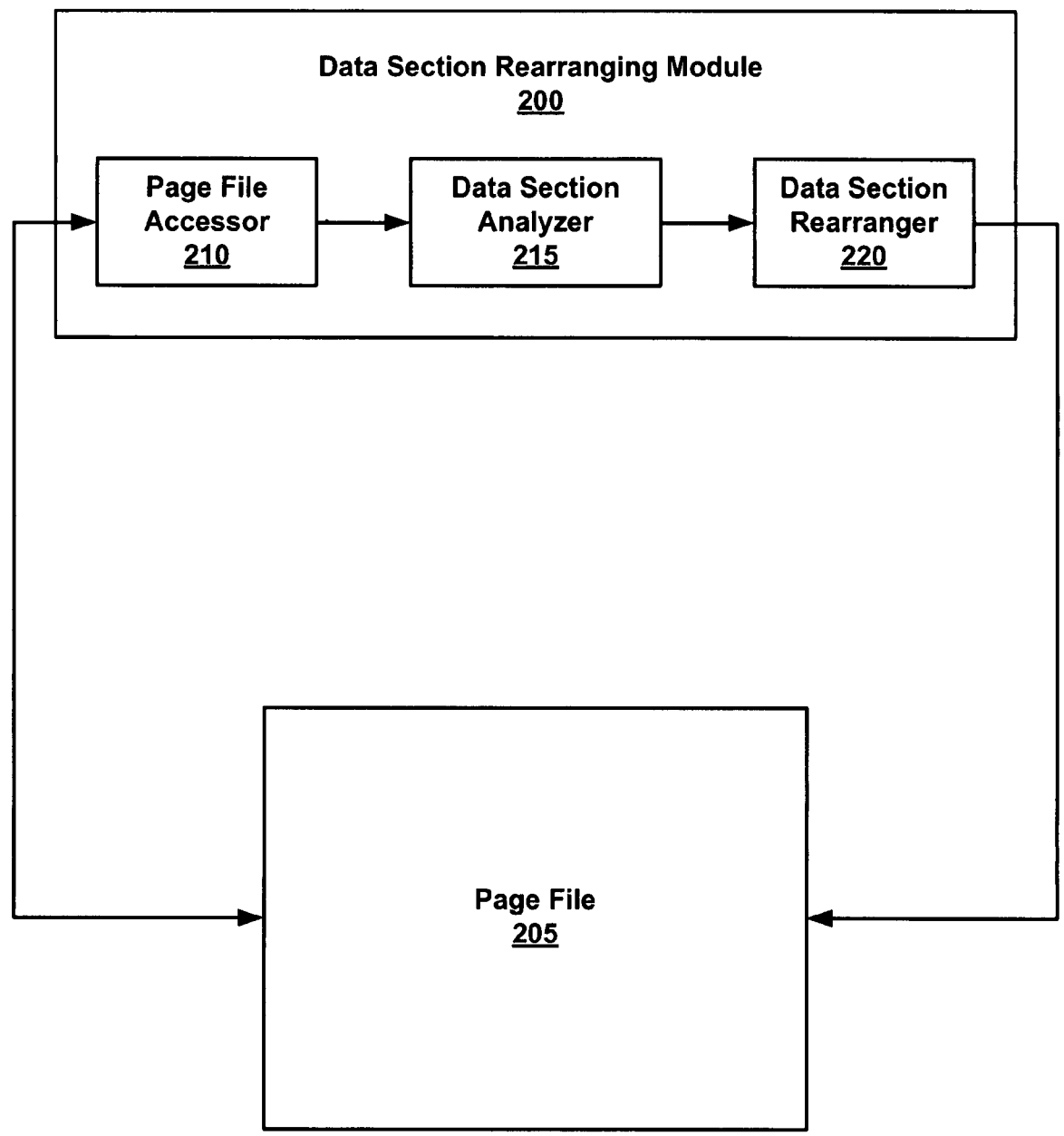
FIG. 2 is a block diagram of an example data section rearranging module for rearranging data sections within a page file associated with an operating system in accordance with one embodiment of the present technology.

With reference now to FIG. 2, a block diagram of an example data section rearranging module 200 is shown in accordance with one embodiment of the present technology. In general, data section rearranging module 200 includes page file accessor 210, data section analyzer 215, and data section rearranger 220, all communicatively coupled to page file 205.

Figure 3:
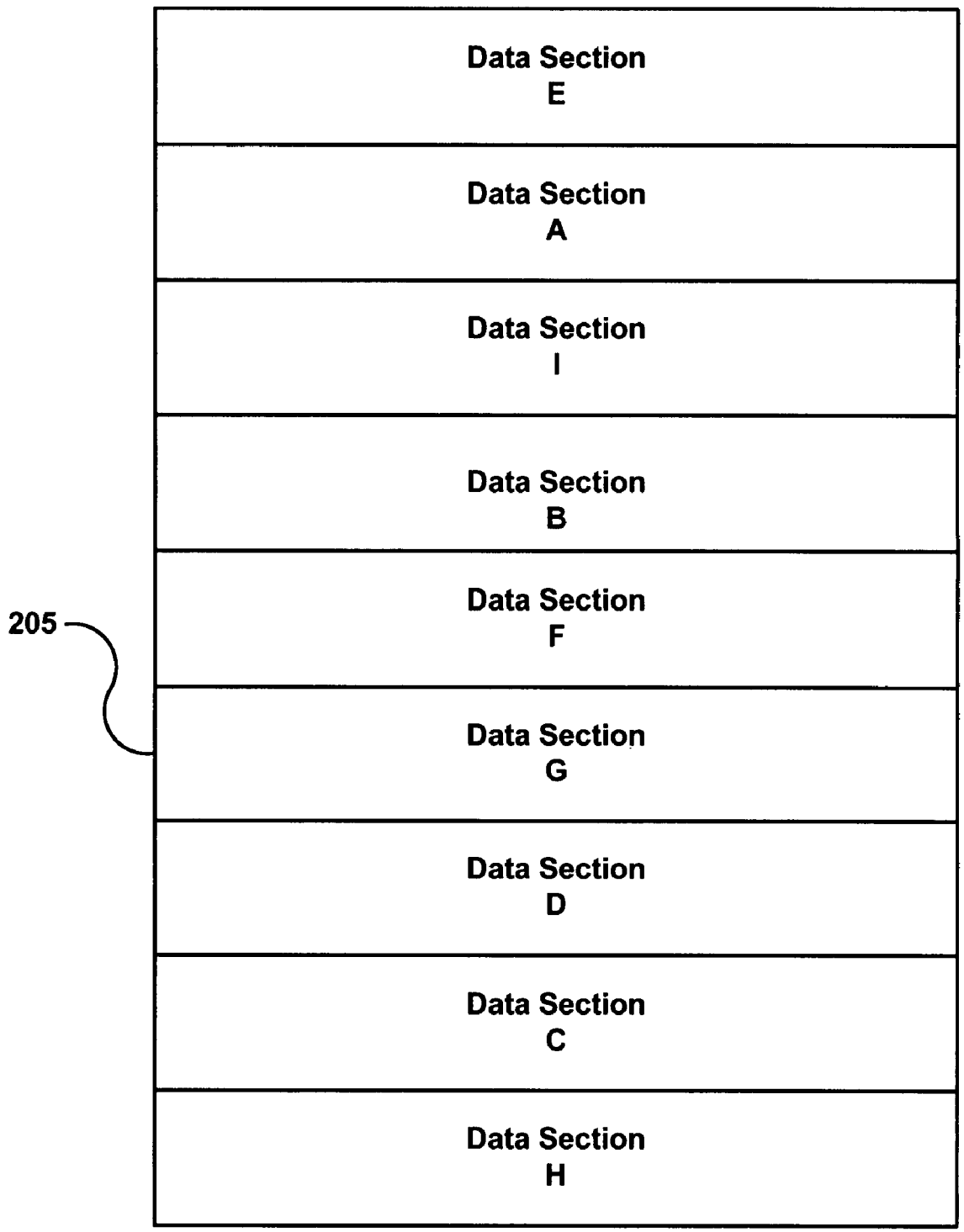
FIG. 3 is a block diagram of an example page file wherein the page file contains some non-contiguous data sections, in accordance with one embodiment of the present technology.

In one embodiment, page file accessor 210 is configured to access page file 205, wherein page file 205 comprises one or more data sections. These data sections may represent processes within a file. Referring to 300 of FIG. 3, an example of page file 205 comprising non-contiguous data sections A through I is shown. FIG. 3 describes page file 205 having nine data sections, some of which are contiguous, while others are non-contiguous. For example, while data sections F and G are contiguous, data sections A, B, C, D, E, H, and I are non-contiguous.

In one embodiment, data section analyzer 215 is configured to analyze page file's 205 data sections. For example, referring again to FIG. 2 and page file 205 of FIG. 3, data section analyzer 215 analyzes data sections A through I. In so analyzing, data section analyzer 215 determines the possible placement of data sections so that at least one or more of these non-contiguous data sections are contiguous. It is appreciated however, that any module within data section rearranging module 200 may determine the possible placement of data sections so that at least one or more of these non-contiguous data sections are contiguous.

For example, data sections A, B, C, D, E, H, and I are non-contiguous, while F and G are contiguous. Data section analyzer 215 would determine that data sections A, B, C, D, E, H, and I are to be rearranged such that at least one or more of data sections A, B, C, D, E, H, and I are contiguous.

Figure 4:
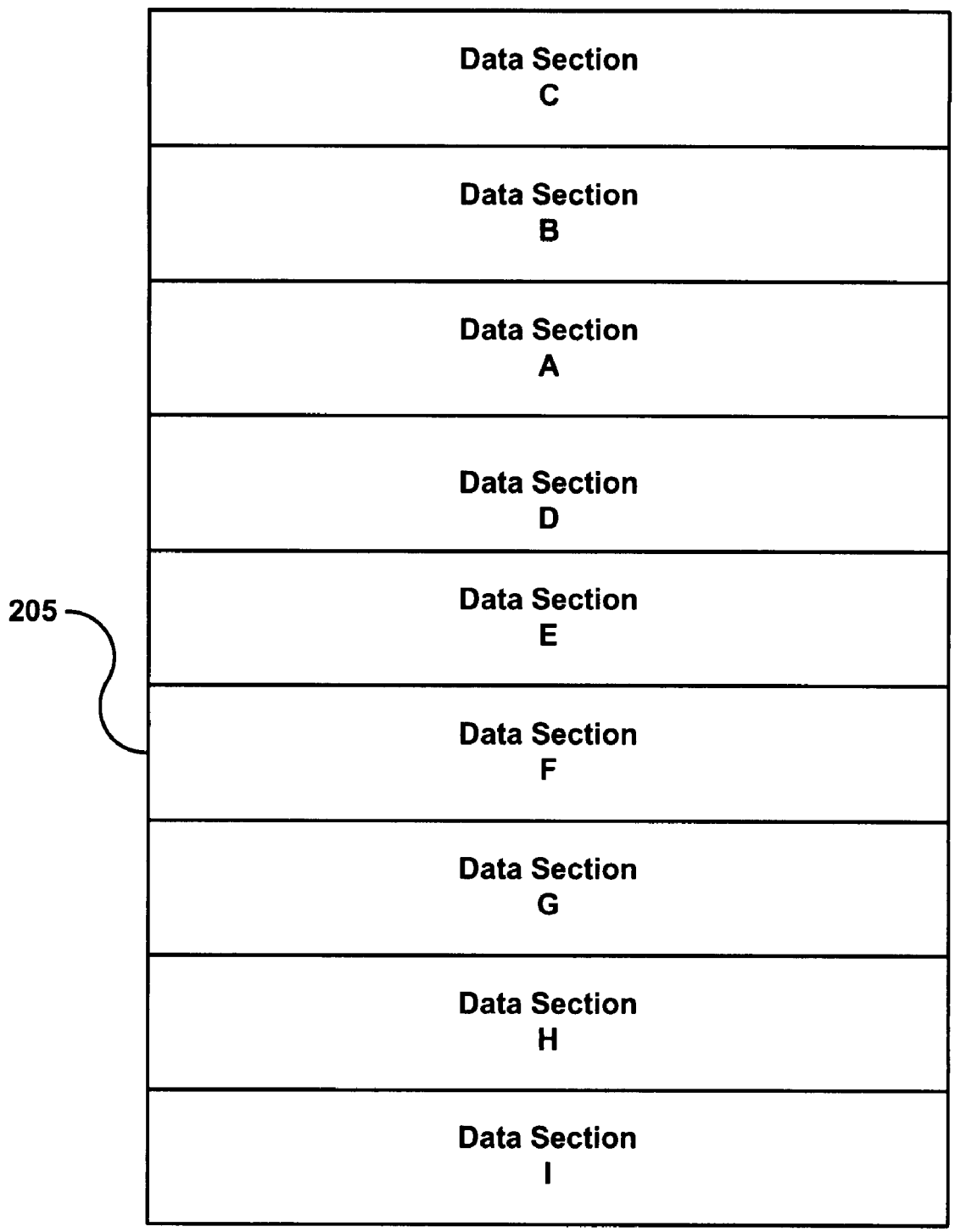
FIG. 4 is a block diagram of an example page file wherein at least one or more of the non-contiguous data sections as described in FIG. 3 are placed so as to be contiguous, in accordance with one embodiment of the present technology.

In one embodiment, data section rearranger 220 is configured to rearrange data sections such that at least one or more non-contiguous data sections are contiguous within page file 205. Referring now to 400 of FIG. 4, page file 205 with rearranged data sections A through I is shown. As shown, at least one or more of the formally non-contiguous data sections A through I of FIG. 3 are now contiguous within page file 205. For example, D, E, F, G, H, and I are contiguous within page file 205, while A, B, and C remain non-contiguous within page file 205.

When these data sections A through I are rearranged so as to be more contiguous, the hard drive head does not have to move to as many different locations on the hard drive platter to gather these data sections A through I, thereby reducing input/output functions associated with retrieving data sections.

It is appreciated that the present technology may be application specific. For example, operating system 122 would be updated to provide a kernel which operates to rearrange data sections of specific programs.

In a real world example of a single page file 205 containing a large application, page file 205 may contain an entire encyclopedia. In this case, page file 205 has numerous data sections. These data sections may have become non-contiguous by a variety of means, such as by an author's edits made at the end of the project. As a result of the author's edits, page file 205 now contains poorly laid out data sections. For example, page file 205 contains illogically related interleaved data. Page file 205 also contains unneeded data intermingled with data that will eventually be read.

Figure 5:
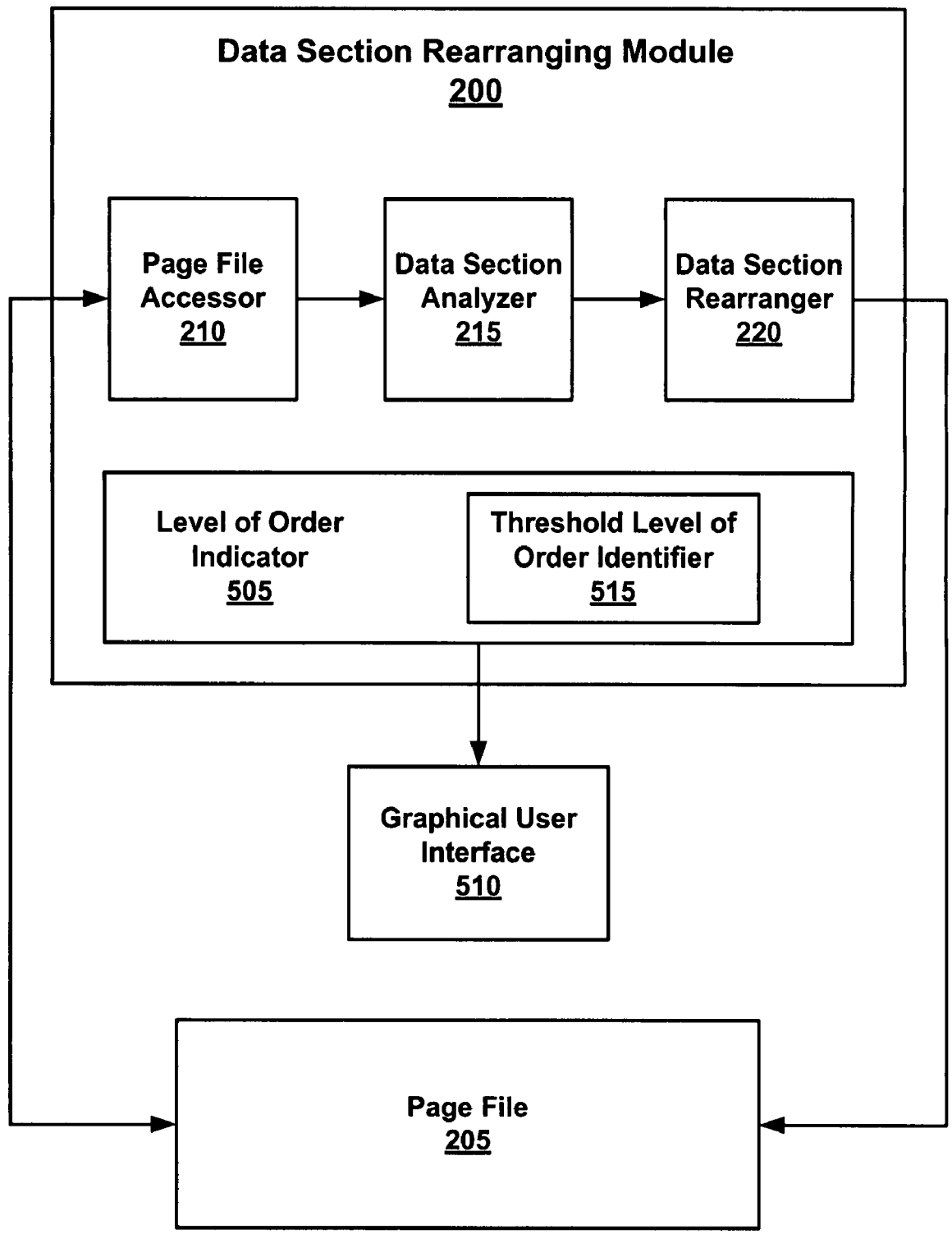
FIG. 5 is a block diagram of an example data section rearranging module in accordance with one embodiment of the present technology.

With reference to FIG. 5, a block diagram of an example data section rearranging module in accordance with one embodiment of the present technology is shown. Referring now to FIG. 2 and to 505 of FIG. 5, in one embodiment level of order indicator 505 indicates a level of order within page file 205. For example, the term 'level of order' refers to the state of contiguousness of data sections within page file 205. Level of order indicator 505 could provide an audible, visual, and/or textual message indicating the state of contiguousness within page file 205. It is appreciated that level or order indicator 505 may utilize a graphical user interface configured to present the state of contiguousness of data sections within page file 205.

For example, the visual message could be made up of bars of colors, while each color could represent a degree of contiguousness within page file 205. The bars of colors could be represented by the colors green, yellow, and red. Green may represent a state of high contiguousness of data sections within a page file. Yellow may represent a state of partial contiguousness of data sections within a page file. Red may represent a state of low contiguousness of data sections within a page file. The definition of 'high contiguousness', 'partial contiguousness', and 'low contiguousness' of data sections within page file 205 is pre-determined by the user and/or program itself.

Additionally, level of order indicator 505 could provide a visual message via a bar of sequential numbers, such as one through ten. The number 'one' may represent the lowest state of contiguousness of data sections, while the number 'ten' may represent the highest state of contiguousness of data sections.

In another example, level of order indicator 505 comprises a graphical user interface 510 configured to indicate the level of order within page file 205. For example, suppose level of order indicator 505 utilizing a bar of sequential numbers indicates a level '4'. Graphical user interface 510 may display the number '4' and/or some other visual message signifying the number 4. Additionally, the number '4' may be displayed alone or in combination with an audible and/or textural message.

In one embodiment of the present technology, a threshold level of order identifier 515 is configured to identify a threshold level of order for page file 205. When the level of order of page file 205 is greater than the threshold level of order, data sections within page file 205 are rearranged to be more contiguous. For example, threshold level of order identifier 515 identifies a page file's 205 threshold level of order to be that of a number '3'. When level of order indicator 505 indicates that page file's 205 level of order is a '2', the present technology automatically rearranges the data sections to be in a more contiguous state. It is appreciated that threshold level of order identifier 515 may utilize a graphical user interface to present a threshold level of order.

Referring to FIGS. 5 and 220 FIG. 2, in one embodiment, data section rearranger 220 may be a periodic data section rearranger. Periodic data section rearranger is configured to periodically rearrange data sections such that at least one or more non-contiguous data sections are contiguous within page file 205. For example, a periodic rearrangement may occur on a pre-determined schedule set by the user or the program itself. Additionally and/or alternatively, the computer may initiate rearrangement of non-contiguous data sections.

In one example of periodic rearrangement of data sections, a user leaves his computer running overnight at the workplace. The user has given the computer instructions to rearrange data sections into a more contiguous state every hour for a period of ten hours, starting at six p.m. Consequently, beginning at six p.m. and every hour thereafter for ten hours, the periodic data section rearranger rearranges data sections such that at least one or more noncontiguous data sections are contiguous within page file 205. Alternatively, a computer application may already be programmed to initiate a periodic rearrangement of data sections beginning at a certain time at night.

In another example of periodic rearrangement of data sections, a computer is configured to understand when the computer is not being utilized for any function. Based upon the computer's lack of activity, the periodic data section rearranger begins to rearrange data sections to be more contiguous within page file 205.

In one embodiment, data section rearranger 220 is a fragmented page file system layout rearranger. Fragmented page file system layout rearranger is configured to rearrange data sections such that at least one or more non-contiguous data sections are contiguous within page file 205; in this case, page file 205 is part of a fragmented page file system layout. For example, when the present technology rearranges data sections, at least one or more of page files 205 holding data sections within a page file system are themselves non-contiguous.

Fragmentation refers to the condition of a hard disk in which an entire file is divided into page files 205 scattered around the disk. Operating system 122 cannot or will not allocate enough contiguous space to store a complete file as a unit. Instead, it puts page files 205 in gaps between other page files 205. Usually these gaps exist because the gaps formerly held a page file 205 that operating system 122 has subsequently deleted, or because operating system 122 allocated excess space for an entire file in the first place.

Rearranging data sections within page file 205 when page files 205 are themselves fragmented still has benefits. For example, suppose that a single page file 205 contains all of an application. The data sections within page file 205 containing this application would be rearranged so that at least one or more non-contiguous data sections are contiguous. This whole application could be read into RAM, and yet only one input/output was needed to perform this task. Hence, the number of input/outputs needed to read data sections into RAM is reduced.

In one embodiment, data section rearranger 220 is a defragmented page file system layout rearranger. Defragmented page file system layout rearranger is configured to rearrange data sections such that at least one or more non-contiguous data sections are contiguous within page file 205. In this case, page file 205 is part of a defragmented page file system layout. For example, when the present technology rearranges data sections, the page files 205 themselves have been defragmented. Or in other words, the page files 205 themselves have been made to be more contiguous.

Operation

With reference now to FIG. 6, a flowchart 600 of a computer implemented example method for rearranging data sections within page file 205 associated with operating system 122 is shown in accordance with one embodiment of the present technology.

Referring now to 605 of FIG. 6 and to FIG. 2, one embodiment accesses page file 205 which comprises one or more data sections. As described herein, page file accessor 210 accesses one or more data sections of page file 205.

Referring now to 610 of FIG. 6 and to FIG. 2, one embodiment analyzes data sections within page file 205. As described herein, data section analyzer 215 analyzes data sections within page file 205. In so analyzing, data section analyzer 215 determines what the possible placement of data sections would be so that at least one or more non-contiguous data sections are contiguous. Explanations herein regarding analyzing data sections within page file 205 apply to "analyzing one or more characteristics of said data sections within said page file".

However, it is appreciated that any module within data section rearranging module 200 may determine the possible placement of data sections so that at least one or more non-contiguous data sections are contiguous. Additionally, the possible placement of data sections to be more contiguous within a page file may be application specific. For example, operating system 122 may be updated to include a kernel which would perform in a manner consistent with the present technology. The kernel understands when data sections are in a non-contiguous state, and drives the rearrangement of these data sections to be in a more contiguous state.

Referring now to 615 of FIG. 6, FIG. 2, and FIG. 5, one embodiment rearranges data sections such that at least one or more non-contiguous data sections are contiguous within page file 205. As described herein, data section rearranger 220 rearranges data sections such that at least one or more non-contiguous data sections are contiguous within page file 205. Explanations herein regarding rearranging data sections such that at least one or more non-contiguous data sections are contiguous within page file 205 apply to "reordering said data sections such that at least said one or more non-contiguous data sections are contiguous within said page file".

In one example, periodic data section rearranger 220 periodically rearranges at least one or more non-contiguous data sections to be contiguous. For instance, data sections may be rearranged according to a pre-set time schedule defined by the user and/or the program itself. For example, the user may wish that non-contiguous data sections be rearranged every hour starting at 2 a.m. and ending at 7 a.m.

Additionally, data sections may be rearranged according to a pre-set condition schedule. For example, data section rearranging module 200 determines that computer system 100 has not been utilized for two or more hours. In response to this non-use, data section rearranging module initiates accessing page file 205 which comprises one or more data sections. Explanations herein regarding rearranging periodically data sections also apply to "reordering periodically said data sections such that at least said one or more non-contiguous data sections are contiguous within page file".

In one embodiment, rearranging data sections 615 involves rearranging data sections such that at least one or more non-contiguous data sections are contiguous within page file 205, wherein page file 205 is part of a fragmented page file system layout. Explanations herein regarding rearranging data sections wherein page file 205 is part of a fragmented page file system layout apply to "reordering said data sections such that at least said one or more non-contiguous data sections are contiguous within said page file, said page file being part of a fragmented page file system layout".

In another embodiment, rearranging data sections 615 involves rearranging data sections such that at least one or more of these non-contiguous data sections are contiguous within page file 205, wherein page file 205 is part of a defragmented page file system layout. Explanations herein regarding rearranging data sections wherein page file 205 is part of a defragmented page file system layout apply to "reordering said data sections such that at least said one or more non-contiguous data sections are contiguous within said page file, said page file being part of a defragmented page file system layout".

Figure 7:
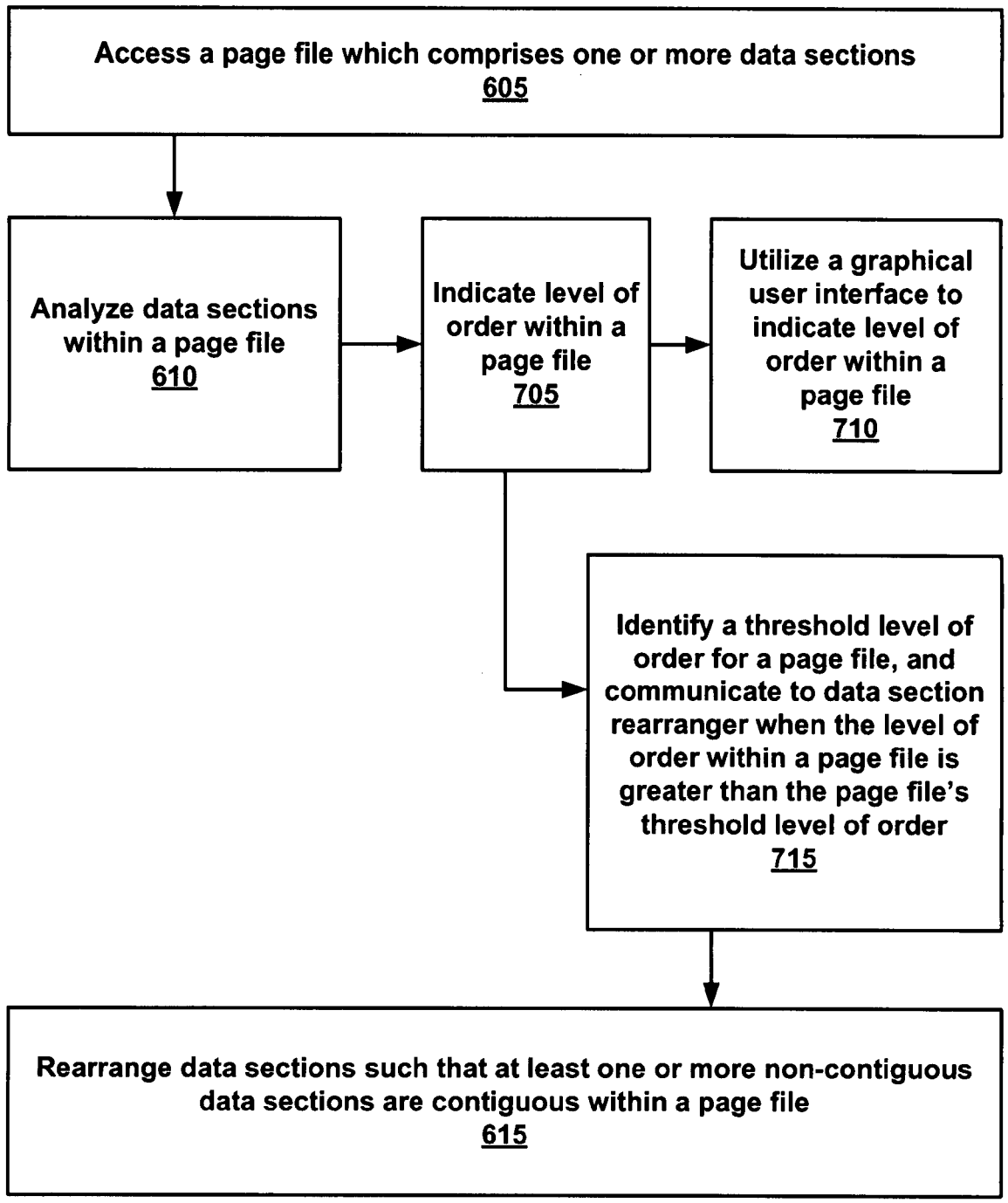
FIG. 7 is a flowchart of an example method for rearranging data sections within a page file associated with an operating system in accordance with one embodiment of the present technology.

With reference now to FIG. 7, a flowchart 700 of a computer implemented example method for rearranging data sections within page file 205 associated with operating system 122 is shown in accordance with one embodiment of the present technology.

Referring to 705 of FIG. 7 and to FIG. 5, one embodiment indicates a level of order within page file 205. For example, level of order indicator 505 indicates the level of order within page file 205 using means such as visual, audio, and/or textural representations. Examples of visual representations may be alphanumeric and/or color representations. Explanations herein regarding indicating a level of order within a page file 705 apply to "providing an indication of a level of order with said page file".

Referring now to 710 of FIG. 7, FIG. 2, and to FIG. 5, another embodiment utilizes graphical user interface 510 to indicate a level of order with page file 205. For example, graphical user interface 510 displays the level of order of non-contiguousness within page file 205, determined by level of order indicator 505.

Referring to 715 of FIG. 7, FIG. 2, and FIG. 5, one embodiment identifies a threshold level of order for page file 205. This threshold level of order is then communicated to data section rearranger 220 when page file's 205 level of order is greater than page file's 205 threshold level of order. For example, threshold level or order identifier 515 identifies page file's 205 threshold level of order. The threshold level of order is a condition that if the level is surpassed, would indicate that page file 205 is in need of being rearranged to a more contiguous state. When page file's 205 level of order becomes greater than the page file's 205 identified threshold level of order, data section rearranger 220 rearranges data sections such that at least one or more non-contiguous data sections are contiguous within page file 205. It is appreciated that threshold level of order identifier 515 may utilize a graphical user interface to indicate a threshold level of order.

Thus, the present technology provides a computer implemented method for rearranging data sections within page file 205 associated with operating system 122. Hence, the present technology's enablement of the rearrangement of data sections within page file 205 to be more contiguous, allows for the reduction in the time spent searching for needed data sections.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for rearranging data sections within a page file associated with an operating system, said method comprising:
   accessing said page file by a computer, said page file comprising a plurality of data sections;
   analyzing said plurality of data sections within said page file by said computer; and
   rearranging said plurality of data sections by said computer such that at least one or more non-contiguous data sections are contiguous within said page file.

2. The computer implemented method of claim 1 further comprising:
   indicating level of order within said page file by said computer.

3. The computer implemented method of claim 2 further comprising:
   utilizing by said computer a graphical user interface for said indicating level of order within said page file.

4. The computer implemented method of claim 2 further comprising:
   identifying a threshold level of order for said page file by said computer, and said rearranging said plurality of data sections when said level of order within said page file is greater than said threshold level of order.

5. The computer implemented method of claim 1 further comprising:
   rearranging periodically said plurality of data sections by said computer such that at least said one or more non-contiguous data sections are contiguous within said page file.

6. The computer implemented method of claim 1 further comprising:
   rearranging said plurality of data sections by said computer such that at least said one or more non-contiguous data sections are contiguous within said page file, said page file being part of a fragmented page file system layout.

7. The computer implemented method of claim 1 further comprising:
   rearranging said plurality of data sections by said computer such that at least said one or more non-contiguous data sections are contiguous within said page file, said page file being part of a defragmented page file system layout.

8. A computer system for rearranging data sections within a page file associated with an operating system, said computer system comprising:
   a processor; and
   memory, wherein said memory comprises executable instructions stored therein that when executed by said processor:
   accesses said page file, said page file comprising a plurality of data sections;
   analyzing said plurality of data sections within said page file; and
   rearranging said plurality of data sections such that at least one or more non-contiguous data sections are contiguous within said page file.

9. The computer system of claim 8 further comprising:
   a level of order indicator configured to indicate a level of order within said page file.

10. The computer system of claim 9 further comprising:
    a graphical user interface configured to indicate said level of order within said page file.

11. The computer system of claim 9 further comprising:

a threshold level of order identifier configured to identify a threshold level of order for said page file, and rearrange said plurality of data sections within said page file when said level of order of said page file is greater than said threshold level of order.

12. The computer system of claim 8 further comprises:

a periodic data section rearranger configured to rearrange periodically said plurality of data sections such that at least said one or more non-contiguous data sections are contiguous within said page file.

13. The computer system of claim 8 further comprises:

a fragmented page file system layout rearranger configured to rearrange said plurality of data sections such that at least said one or more non-contiguous data sections are contiguous within said page file, said page file being part of a fragmented page file system layout.

14. The computer system of claim 8 further comprises:

a defragmented page file system layout rearranger configured to rearrange said plurality of data sections such that at least said one or more non-contiguous data sections are contiguous within said page file, said page file being part of a defragmented page file system layout.

15. Instructions of a computer-usable storage medium wherein the instructions when executed cause a computer system to perform a method for rearranging data sections within a page file associated with an operating system, said method comprising:

accessing said page file, said page file comprising a plurality of data sections;

analyzing one or more characteristics of said plurality of data sections within said page file; and reordering said plurality of data sections such that at least one or more non-contiguous data sections are contiguous within said page file.

16. The instructions on a computer usable storage medium of claim 15 further comprising:

providing an indication of a level of order within said page file.

17. The instructions on a computer usable storage medium of claim 16 further comprising:

utilizing a graphical user interface for said providing an indication of a level of order within said page file.

18. The instructions on a computer usable storage medium of claim 15 further comprising:

reordering periodically said plurality of data sections such that at least said one or more non-contiguous data sections are contiguous within said page file.

19. The instructions on a computer usable storage medium of claim 15 further comprising:

reordering said plurality of data sections such that at least said one or more non-contiguous data sections are contiguous within said page file, said page file being part of a fragmented page file system layout.

20. The instructions on a computer usable storage medium of claim 15 further comprising:

reordering said plurality of data sections such that at least said one or more non-contiguous data sections are contiguous within said page file, said page file being part of a defragmented page file system layout.

\* \* \* \* \*